United States Patent Office 3,629,473
Patented Dec. 21, 1971

3,629,473
ANTI-INFLAMMATORY AGENTS AND COMPOSITIONS
Karl J. Doebel, Ossining, N.Y., and André R. Gagneux, Basel, Switzerland, assignors to Ciba-Geigy Corporation, Greenburgh, N.Y.
No Drawing. Continuation-in-part of applications Ser. No. 721,928, and Ser. No. 721,929, both Apr. 17, 1968, which are continuations-in-part of application Ser. No. 500,245, Oct. 21, 1965. This application Nov. 7, 1969, Ser. No. 874,947
Int. Cl. A61k 27/00
U.S. Cl. 424—263                                      12 Claims

ABSTRACT OF THE DISCLOSURE

A method and compositions for producing anti-inflammatory effects in warm-blooded animals by administration of an effective amount of a derivative of pyridyl-2-mercaptoimidazole, such as, for example, 1-(2-pyridyl)-5-methyl-2-mercaptoimidazole.

CROSS-REFERENCE TO RELATED CASES

This is a continuation-in-part of application Ser. No. 721,928 now U.S. Pat. No. 3,488,423 and Ser. No. 721,829, now allowed, filed Apr. 17, 1968, which are continuation-in-parts of application Ser. No. 500,245 filed Oct. 21, 1965, now abandoned.

DETAILED DISCLOSURE

This invention relates to a process for producing anti-inflammatory effects in warm-blooded animals, particularly mammals, by administering to them certain derivatives of pyridyl-2-mercaptoimidazole in effective amounts. This invention pertains also to pharmaceutical compositions containing such 1-pyridyl-2-mercaptoimidazole derivatives.

More specifically, the process of this invention employs substituted 2-mercaptoimidazole derivatives which can be represented by the following formula:

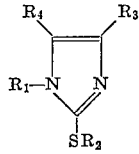

wherein:

$R_1$ is 2-, 3-, or 4-pyridyl
$R_2$ is hydrogen or lower alkyl
$R_3$ is hydrogen or lower alkyl
$R_4$ is hydrogen, lower alkyl or monocarbocyclic aryl.

The term "lower alkyl" as used herein means saturated monovalent aliphatic radicals of the formula —$C_mH_{2m+1}$ wherein $m$ designates an integer of less than 5 and is inclusive of both straight chain and branched chain radicals. The term "monocarbocyclic aryl" as used herein means phenyl and phenyl mono-, di- or tri-substituted by lower alkyl, lower alkoxy, halogen (fluorine, bromine, chlorine, iodine) or trifluoromethyl.

The present invention comprehends not only the above-described derivatives of 2-mercaptoimidazole in its free base form, but it also includes pharmaceutically acceptable, non-toxic acid addition salts thereof. Such salts are derived from inorganic and organic acids, such as hydrohalic acids, especially hydrochloric and hydrobromic acids, sulfuric, ethanesulfonic and phosphoric acids as well as acetic, aminoacetic, lactic, succinic, malic, aconitic, phthalic, tartaric acids, etc.

The compounds defined by the above formula can be synthesized, for example, by reacting a suitable primary amine with an amino ketone or an acetal or ketal thereof followed by treatment with acid to induce hydrolysis and cyclization. If $R_2$ is lower alkyl, alkylation of the compounds is executed by means of an alkylating agent, for instance, alkyl halide.

The methods for the preparation of these compounds can be exemplified more fully by the following illustrative examples. The temperatures therein are given in degrees centigrade.

EXAMPLE 1.—1-(2-PYRIDYL)-5-METHYL-2-MERCAPTOIMIDAZOLE (a) Pyridine-2-isothiocyanate Pyridine-2-isothiocyanate was prepared as previously described by A. E. S. Fairfield and D. A. Peak, J. Chem. Soc. 1955, 796.

(b) Desired compound 1-amino-2,2-ethylenedioxy propane (7.02 g., 0.06 mole) in isopropanol (24 ml.) was added slowly to a cooled solution of pyridine-2-isothiocyanate (8.16 g.) in isopropanol (24 ml.). The mixture was heated under reflux for ½ hour and cooled in an ice bath. Ethanolic hydrochloric acid (12 ml. 9.9 N) was added and the reaction mixture was stirred under reflux for one hour. Product (9.8 g., M.P. 206–8°) crystallized. The product (the hydrochloride salt) was suspended in water (30 ml.), the pH was adjusted to 9 with saturated sodium carbonate solution and the suspension was extracted with chloroform (3 × 60 ml.). The chloroform extract was washed with water, dried over sodium sulfate and evaporated to dryness to give solid (7.8 g., M.P. 185–7°). The free base was treated with charcoal in methanol solution (100 ml.), the methanolic solution was re-evaporated to dryness, and the product was twice recrystallized from isopropanol (60 ml.) to yield screening sample (4.4 g., M.P. 185–7°).
Ultraviolet spectrum:

$$\lambda^{MeOH}_{max.}$$

255 mμ (ε, 11 700).
The thin layer chromatography: 90 CHCl₃, 10 3A EtOH.
Analysis.—Calc'd for $C_9H_9N_3S$ (M.W. 191.25 (percent): C, 56.51; H, 4.75; N, 21.96; S, 16.77. Found (percent): C, 56.28; H, 4.81; N, 21.69; S, 16.88.

EXAMPLE 2.—1-(3-PYRIDYL)-2-MERCAPTO-IMIDAZOLE

A solution of aminoacetaldehyde diethylacetal isothiocyanate (14.0 g., 0.08 mole) in isopropanol (30 ml.) was slowly added to a cooled solution of 3-aminopyridine (7.52 g., 0.08 mole) in isopropanol (35 ml.). The reaction mixture was heated under reflux for one-half hour and cooled in an ice bath. Ethanolic hydrochloric acid (9.9 N, 16 ml.) was added. Heating under reflux was resumed for three hours. The product (14.8 g., M.P. 271–273°) crystallized as the hydrochloride salt. This was dissolved in water (ca. 75 ml.), the solution was neutralized to pH 8 with saturated sodium carbonate solution yielding a tan precipitate (11.3 g., M.P. 247–250° dec.). This was recrystallized from methanol (charcoal, 250 ml.) to give product (9.2 g., M.P. 249–251° dec.). Two additional recrystallizations from methanol (200 ml.) gave screening sample (7.5 g., M.P. 248–250° dec.).

Thin layer chromatography: 90 CHCl₃, 10 3A EtOH.

*Analysis.*—Calc'd for $C_8H_7N_3S$ (M.W. 177.23), (percent): C, 54.21; H, 3.98; N, 23.71; S, 18.09. Found (percent): C, 54.31; H, 4.26; N, 23.53; S, 18.05.

Ultraviolet spectrum:

$$\lambda_{max.}^{MeOH}$$

248 m$\mu$ ($\epsilon$, 11,300); shoulder at 300 m$\mu$.

EXAMPLE 3.—1-(3-PYRIDYL)-5-METHYL-2-MERCAPTOIMIDAZOLE (a) 3-pyridine isothiocyanate 3-pyridine isothiocyanate was prepared by a method differing from that previously described by A. E. S. Fairfield, D. A. Peak, J. Chem. Soc. 1955, 796. Thiophosgene (25.0 g., 0.217 mole) was added dropwise while cooling to a mixture of 3-aminopyridine (20.42 g., 0.217 mole), CaCO₃ (50.0 g.), chloroform (100 ml.) and water (100 ml.) agitated by means of a vibromixer. After the addition was complete the reaction mixture was agitated at 35–40° for three hours. Salts were removed by filtration, the chloroform layer was separated and the aqueous layer was further extracted with chloroform (3× 200 ml.). The chloroform extract was washed with water, dried over sodium sulfate and evaporated to dryness. The residue was then distilled to yield title compound (2.4 g., B.P. 108–109°/9 mm.).

(b) Desired compound 1-amino - 2,2 - ethylene dioxypropane (1.17 g., 0.01 mole) in isopropanol (4 ml.) was added dropwise to a cooled solution of 3-pyridine isothiocyanate in isopropanol (4 ml.). The reaction mixture was heated under reflux for one-half hour and cooled. Ethanolic hydrochloric acid (9.9 N, 2.0 ml.) was added and the reaction mixture was again stirred under reflux for one hour. Product (2.2 g., M.P. 269–271° dec.) recrystallized on cooling. This hydrochloride salt was dissolved in water (10 ml.), the solution was rendered alkaline to pH 8–9 with saturated sodium carbonate solution and the precipitated solid was removed by filtration; yield: 1.6 g., M.P. 227–229°. Recrystalization from isopropanol (50 ml.) gave screening sample (1.4 g., M.P. 225–227°).

*Analysis.*—Calc'd for $C_9H_9N_3S$ (M.W. 191.25), percent: C, 56.51, H, 4.75, N, 21.96, S, 16.77. Found percent: C, 56.61, H, 4.76, N, 21.88, S, 16.80.

Ultraviolet spectrum:

$$\lambda_{max.}^{MeOH}$$

256 m$\mu$ ($\epsilon$, 12.500).

EXAMPLE 4.—1-(2-PYRIDYL)-5-(P-CHLOROPHENYL)-2-MERCAPTOIMIDAZOLE (a) 1-(2-pyridyl)-3-(p-chlorophenacyl)-2-thiourea α - Amino-p-chloroacetophenone hydrochloride (0.06 mole, 12.4 g.) was added to a cold solution of 2-pyridine isothiocyanate (.06 mole, 8.25 g.) in dry pyridine (100 ml.). The mixture was stirred at room temperature for an hour and then at 80° for 15 hours. The mixture was poured into ice water (180 ml.) after cooling to room temperature and the solution was made basic with Na₂CO₃ (satd. soln., 225 ml.). The crude product was filtered off and washed first with water and then isopropanol; yield: 14.62., brown crystals, M.P. 207–10°. Recrystallization from CHCl₃ (400 ml.), isopropanol (700 ml.) yielded colorless crystals (11.68 g., M.P. 214–6° dec.). TLC–90 CHCl₃, 10 3Z ethanol showed only one major component.

(b) 1-(2-pyridyl)-5-(p-chlorophenyl)-2-mercaptoimidazole

A solution of 1 N HCl (.0305 mole, 30.5 ml.) in methanol (abs. reag., 150 ml.) was added at room temperature to a suspension of 1-(2-pyridyl)-3-(p-chlorophenacyl)-2-thiourea (.0305 mole, 9.31 g.) in methanol (abs. reag., 200 ml.) and the mixture was heated under reflux for three hours; the solution became yellow immediately. The product precipitated out of the reaction mixture upon cooling. It was filtered off, washed with methanol, and dried in the vacuum oven; yield: 6.33 g., M.P. 283–7°. The crude product was recrystallized from methanol (abs. reag., 300 ml.) to yield pure product sample (4.63 g., M.P. 283–7°).

Ultraviolet spectrum:

$$\lambda_{max.}^{MeOH}$$

300 m$\mu$.

*Analysis.*—Calc'd for $C_{14}H_{10}ClN_3S$ (M.W. 287.77), percent: C, 58.43, H, 3.51, N, 14.61, Cl. 12.33, S, 11.15. Found, percent: C, 58.14, H, 3.77, N, 14.53, Cl, 12.41, S, 11.14.

EXAMPLE 5.—1-(2 - PYRIDYL) - 5 - METHYL-2-METHYLMERCAPTOIMIDAZOLE HYDROCHLORIDE

A solution of 0.48 g. of 1-(2-pyridyl)-5-methyl-2-mercaptoimidazole and 0.385 g. of methyl iodide in 7 ml. of anhydrous methanol was heated under reflux for 2 hours and evaporated to dryness. The residue was suspended in water and the suspension was rendered basic to a pH of 9 to 10 with saturated sodium carbonate solution. The suspension was extracted with 50 ml. of chloroform, dried over sodium sulfate and evaporated to dryness to given an oil. This oil was dissolved in isopropanol, cooled and treated with 0.28 ml. of 9.16 N ethanolic hydrochloric acid. After the addition of ether, the desired compound crystallized. On recrystallization from 6 ml. of a mixture of isopropanol and hexane in a proportion of 1:1, 0.32 g., of the desired compound, M.P. 152–154° C. was obtained.

As indicated above, the compounds described hereinabove can be employed as anti-inflammatory agents to treat the four cardinal symptoms of inflammation: swelling, redness, pain, and heat. The compounds also exhibit analgesic and anti-pyretic properties. The anti-inflammatory effects in warm-blooded animals were determined by carrageenin and UV erythema tests as follows:

(a) Anti-inflammatory: Carrageenin test

Male rats, five per group, weighing between 150–200 g., were given the test compounds orally one hour before carrageenin. 0.1 cc. of carrageenin was injected into the plantar area of the right hind paw. Three hours after administration of carrageenin and four hours after administration of test compounds or vehicle, the rats were sacrificed. Right and left hind paws were removed and weighed. The difference between these paws was determined for all animals within a group and the average difference calculated. The average difference of the vehicle control group was used as a point of comparison for test groups. If the average difference for a test group was smaller than that of the vehicle control, protection is present and is expressed in percentage of vehicle control. The following illustrative results were obtained.

TABLE I

| 2-mercaptoimidazoles | Dose (mg./kg.) | Percent protection |
|---|---|---|
| 1-(2-pyridyl)-5-methyl | 100 | 26 |
| 1-(3-pyridyl) | 100 | 17 |
| 1-(3-pyridyl)-5-methyl | 100 | 31 |

(b) Anti-inflammatory: Ultraviolet erythema test

Guinea pigs, either sex, five per group, weighing between 275–375 grams, having their hair removed by using animal electrical clippers followed by chemical depilation with Nair. The next morning test compounds are given orally. Half of the total dose is given one hour before ultra violet irradiation. The other half is given immediately after U.V. exposure. Erythema is produced by 60 second exposure to ultra violet rays emitted by a Hanovia Analytical Model Quartz Lamp with a 500 watt high pressure mercury burner. In order to localize erythema to three 7 mm. areas, guinea pigs are confined in rubber gloves with three 7 mm. holes cut in them. Evaluation of results takes place 2 hours and 24 hours after ultra violet exposure. Erythema spots are scored from 0 to 3 giving a maximum total of 9 for an unprotected animal.

0=No visible signs of erythema
1=Faint trace of erythema
2=Definite but ill defined area of erythema
3=Definite and clearly defined area of erythema The scores of all animals within a given group are added together. A maximum score for any group of animals is 45 and is called the maximum degree of inflammation. Any group with a degree of inflammation greater than vehicle control has 0% protection. Groups with values less than the control groups have protection and this is expressed in percent. Table II shows illustrative results.

TABLE II

| 2-mercaptoimidazoles | Dose (mg./kg.) | Percent protection |
|---|---|---|
| 1-(2-pyridyl)-5-methyl | 100 | 61 |
| 1-(3-pyridyl) | 100 | 36 |

The anti-inflammatory agents of this invention can be administered by any of the conventional means available for use in conjunction with pharmaceuticals. Pharmaceutical composition in dosage unit form comprise about 10 mg. to about 500 mg. of the active ingredients.

To produce dosage units for peroral application, the active substances of general Formula 1 or a salt thereof is combined, e.g. with solid powdered carriers such as lactose, sucrose, sorbitol, mannitol; starches such as potato starch, corn starch or amylopectin, also laminaria powder or citrus pulp powder; cellulose derivatives or gelatin, also lubricants such as magnesium or calcium stearate or polyethylene glycols (Carbowaxes) of suitable molecular weights may be added, to form compressed tablets or core tablets for sugar coating. The latter are coated, for example, with concentrated sugar solutions with e.g. can contain gum aribic, talcum and/or titanium dioxide, or they are coated with a lacquer dissolved in easily volatile organic solvents or mixtures of organic solvents. Dyestuffs can be added to these coatings, for example, to distinguish between different contents of active substance. Soft gelatin capsules (pearl-shaped closed capsules) and other capsules consist for example of a mixture of gelatin and glycerin and contain, e.g., mixtures of the active substance or a suitable salt thereof with Carbowax and hard gelatin capsules contain, for example, granulates of the active substance or a suitable salt thereof with solid, powdered carriers such as, e.g. lactose, sucrose, sorbitol, mannitol; starches such as potato starch, corn starch or amylopectin, cellulose, derivatives or gelatin, as well as magnesium stearate or stearic acid. Suppositories are employed as dosage units for rectal application. These consist of a combination of the active substance or a suitable salt thereof with a neutral fatty base, or also gelatin rectal capsules can be employed which consist of a combination of the active substance of a suitable salt thereof with polyethylene glycols (Carbowaxes) of suitable molecular weight.

Ampules for parenteral, particularly intramuscular administration preferably contain a water soluble salt of the active substance of Formula 1 and suitable stabilizing agents and, if necessary, buffer substances in aqueous solution. Anti-oxidizing agents such as sodium bisulfite, sodium sulfite, ascorbic acid or Rongalit (formaldehydesodium bisulfite compound) are suitable as stabilizing agents either alone or combined, in total concentrations between about 0.01 and about 0.5 percent. Because of its ability to form chelates, ascorbic acid has an additional stabilizing effect; in this function it can also be replaced by other chelate-formers. The best stability of the active ingredient is attained, e.g. by mixtures in suitable ratio of sodium sulfite, sodium bisulfite and/or ascorbic acid, or by the addition of other buffer substances such as citric acid and/or salts thereof. In addition, the ampules can contain a slight amount of a usual preservative.

Useful pharcameutical formulations for administration of the compounds of this invention may be illustrated as follows:

Capsules

| | Mg. |
|---|---|
| Active ingredient | 10–500 |
| Lactose | 20–100 |
| Corn starch, U.S.P. | 20–100 |
| Aerosolized silica gel | 2–4 |
| Magnesium stearate | 1–2 |

Tablets

| | |
|---|---|
| Active ingredient | 100 |
| Microcrystalline cellulose | 50 |
| Corn starch, U.S.P. | 80 |
| Lactose, U.S.P. | 50 |
| Magnesium stearate, U.S.P. | 2 |

This tablet can also be sugar coated according to the usual art practices. Colors may be added to the coating.

Chewable tablets

| | Mg. |
|---|---|
| Active ingredient | 100 |
| Mannitol, N.F. | 100 |
| Flavor | 1 |
| Magnesium stearate, U.S.P. | 2 |

Suppositories

| | |
|---|---|
| Active ingredient | 100 |
| Suppository base | 1900 |

Liquid

| | Percent |
|---|---|
| Active ingredient | 2.0 |
| Polyethylene glycol 300, N.F. | 10.0 |
| Glycerin | 5.0 |
| Sodium bisulfite | 0.02 |
| Sorbitol solution 70%, U.S.P. | 50.0 |
| Methylparaben, U.S.P. | 0.1 |
| Propylparaben, U.S.P. | 0.2 |
| Distilled water, U.S.P. qs. 1000.00 cc. | |

Injectable

Active ingredient—25.0 mg.
Polyethylene glycol 600—1.0 cc.
Sodium bisulfite, U.S.P.—0.4 mg.
Water for injection, U.S.P. qs. 2.0 cc.

According to the above disclosure, the invention thus pertains to a process which comprises administering to warm-blooded animals suffering from an anti-inflammatory condition an effective amount of a 2-mercaptoimidazole compound of the Formula I. But in another aspect, the invention also relates to a pharmaceutical composition comprising a pharmaceutical carrier and from about 10 mg. to about 500 mg. of, for example, 1-(2-pyridyl)-5-methyl-2-mercaptoimidazole.

The amount of these compounds which is administered in use to effect an anti-inflammatory response must in all cases be adjusted to the mammal being treated, its age, weight and condition, as well as the degree of response required. Thus while an anti-inflammatory response is observed in the range of about 0.1 mg./kg. to about 300 mg./kg., preferably about 1 mg./kg. to about 100 mg./kg., the actual dose should be carefully titrated to the particular subject in accordance with well-recognized principles of pharmacology.

What is claimed is:

1. A process which comprises administering to a warm-blooded animal suffering from an inflammatory condition an effective amount of a 2-mercaptoimidazole compound of the formula

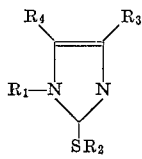

wherein $R_1$ is 2-, 3-, or 4-pyridyl;
$R_2$ is hydrogen or lower alkyl;
$R_3$ is hydrogen or lower alkyl; and
$R_4$ is hydrogen, lower alkyl or phenyl or lower alkyl-, lower alkoxy-, fluoro-, bromo-, chloro-, iodo- or trifluoromethyl-substituted phenyl, or a pharmaceutically acceptable acid addition salt thereof.

2. A process according to claim 1 in which the compound is 1-(2-pyridyl)-5-methyl-2-mercaptoimidazole.

3. A process according to claim 1 in which the compound is 1-(3-pyridyl)-2-mercaptoimidazole.

4. A process according to claim 1 in which the compound is 1-(3-pyridyl)-5-methyl-2-mercaptoimidazole.

5. A process according to claim 1 in which the compound is 1-(2-pyridyl)-5-(p-chlorophenyl)-2-mercaptoimidazole.

6. A process according to claim 1 in which the compound is 1-(2-pyridyl)-5-methyl-2-methylmercaptoimidazole.

7. A pharmaceutical composition comprising from about 10 mg. to about 500 mg. of a compound of the formula

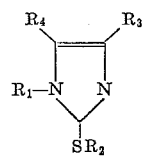

wherein $R_1$ is 2-, 3-, or 4-pyridyl;
$R_2$ is hydrogen or lower alkyl;
$R_3$ is hydrogen or lower alkyl; and
$R_4$ is hydrogen, lower alkyl or phenyl or lower alkyl-, lower alkoxy-, fluoro-, bromo-, chloro-, iodo- or trifluoroomethyl-substituted phenyl, or a pharmaceutically acceptable acid adition salt thereof and a pharmaceutical carrier.

8. A pharmaceutical composition according to claim 7 in which the compound is 1-(2-pyridyl)-5-methyl-2-mercarptoimidazole.

9. A pharmaceutical composition according to claim 7 in which the compound is 1-(3-pyridyl)-2-mercaptoidazole.

10. A pharmaceutical composition according to claim 7 in which the compound is 1-(3-pyridyl)-5-methyl-2-mercaptoimidazole.

11. A pharmaceutical composition according to claim 7 in which the compound is 1-(2-pyridyl)-5-(p-chlorophenyl)-2-mercaptoimidazole.

12. A pharmaceutical composition according to claim 7 in which the compound is 1 - (2 - pyridyl)-5-methyl-2-methylmercaptoimidazole.

References Cited

Jones et al., J. Am. Chem. Soc., vol. 71, December 1944, pp. 4000–4002.

STANLEY J. FRIEDMAN, Primary Examiner

U.S. Cl. X.R.

260—294.8